United States Patent
Schulter et al.

(10) Patent No.: US 10,402,983 B2
(45) Date of Patent: Sep. 3, 2019

(54) SURVEILLANCE SYSTEM USING DEEP NETWORK FLOW FOR MULTI-OBJECT TRACKING

(71) Applicant: NEC Laboratories America, Inc., Princeton, NJ (US)

(72) Inventors: Samuel Schulter, Santa Clara, CA (US); Wongun Choi, Lexington, MA (US); Paul Vernaza, Sunnyvale, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 100 days.

(21) Appl. No.: 15/695,625

(22) Filed: Sep. 5, 2017

(65) Prior Publication Data

US 2018/0130216 A1    May 10, 2018

Related U.S. Application Data

(60) Provisional application No. 62/418,458, filed on Nov. 7, 2016.

(51) Int. Cl.
*G06K 9/00* (2006.01)
*G06T 7/20* (2017.01)
(Continued)

(52) U.S. Cl.
CPC ............ *G06T 7/20* (2013.01); *G06K 9/00771* (2013.01); *G06K 9/6274* (2013.01); *G06T 7/70* (2017.01);
(Continued)

(58) Field of Classification Search
CPC .......... G06K 9/00718; G06K 9/00765; G06K 9/00771; G06K 9/0063; G06K 9/6212;
(Continued)

(56) References Cited

U.S. PATENT DOCUMENTS 8,391,548 B1 *   3/2013  Medioni ............ G06K 9/00771
                                                   382/103
9,160,982 B1 *  10/2015  Daliyot .................. G06T 7/292
(Continued)

OTHER PUBLICATIONS

Laura Leal-Taixe et al., "Everybody Needs Somebody: Modeling Social and Grouping Behavior on a Linear Programming Multiple People Tracker", IEEE International Conference on Computer Vision Workshops (ICCVW), 1st Workshop on Modeling, Simulation and Visual Analysis of Large Crowds, Nov. 2011 (see p. 1, left column, lines 16-20; p. 1, right column, lines 4-24; p. 2, right column, lines 5-12; p. 3, left column, lines 8-16; p. 5, right column, lines 6-8, and figures 2, 6.

(Continued)

*Primary Examiner* — Jose L Couso
(74) *Attorney, Agent, or Firm* — Joseph Kolodka

(57) ABSTRACT

A surveillance system and method are provided. The surveillance system includes at least one camera configured to capture a set of images of a given target area that includes a set of objects to be tracked. The surveillance system includes a memory storing a learning model configured to perform multi-object tracking by jointly learning arbitrarily parameterized and differentiable cost functions for all variables in a linear program that associates object detections with bounding boxes to form trajectories. The surveillance system includes a processor configured to perform surveillance of the target area to (i) detect the objects and track locations of the objects by applying the learning model to the images in a surveillance task that uses the multi-object tracking, and (ii), provide a listing of the objects and their locations for surveillance task. A bi-level optimization is used to minimize a loss defined on a solution of the linear program.

19 Claims, 9 Drawing Sheets

(51) Int. Cl.
*G06T 7/77* (2017.01)
*G06T 7/70* (2017.01)
*H04N 7/18* (2006.01)
*G06K 9/62* (2006.01)

(52) U.S. Cl.
CPC .................. *G06T 7/77* (2017.01); *H04N 7/18* (2013.01); *H04N 7/188* (2013.01); *G06T 2207/20076* (2013.01); *G06T 2207/20081* (2013.01); *G06T 2207/20084* (2013.01); *G06T 2207/30232* (2013.01); *G06T 2207/30241* (2013.01)

(58) Field of Classification Search
CPC .. G06K 9/6215; G06K 9/6218; G06K 9/6249; G06K 9/6255; G06K 9/626; G06K 9/66; G06K 9/6263; G06K 9/00201; G06K 9/00248; G06K 9/00255; G06K 9/00261; G06K 9/00281; G06K 9/00288; G06K 9/00295; G06K 9/00369; G06K 9/00711; G06K 9/00744; G06K 9/00624; G06K 9/00664; G06K 9/00778; G06K 9/00785; G06K 9/00812; G06K 9/00335; G06K 9/00671; G06K 9/00758; G06K 9/4604; G06K 9/6267; G06K 9/6269; G06K 9/469; G06K 9/4671; G06K 9/3233; G06K 9/3208; G06K 2009/00738; G06T 7/0002; G06T 7/13; G06T 7/20; G06T 7/30; G06T 7/60; G06T 7/77; G06T 7/70; G06T 7/73; G06T 7/80; G06T 7/11; G06T 7/246; G06T 7/292; G06T 7/004; G06T 7/194; G06T 2207/10016; G06T 2207/30168; G06T 2207/30196; G06T 2207/30232; G06T 2207/30201; G06T 2207/20081; G06T 2207/20036; H04N 7/181; H04N 7/183; H04N 7/18; H04N 7/185; H04N 7/188; H04N 17/002; H04N 5/144; H04N 5/23296; H04N 5/23238; H04N 5/247; H04N 5/2624; H04N 21/23418; H04N 21/23424; H04N 21/23439; H04N 21/23608; H04N 21/44; H04N 21/466; H04N 21/812; H04N 21/8456; G08B 13/19645; G08B 13/1968; G08B 13/19615; G08B 13/19602; G08B 13/19608; G08B 13/19613; G08B 13/19691; G08B 13/196; G08B 13/19641; G08B 13/1966; G08B 13/19671; G08B 13/19682; G08B 21/0476; G06F 17/28; G06F 17/3028; G06F 17/30259; G06F 17/30268; G06F 17/3079; G06F 17/30799; G06F 17/30805; G06F 17/30811; G06F 17/00; G06F 19/00; G06N 99/005; G06Q 30/0268; G06Q 30/0271; G07F 19/207; G10L 15/265; H04L 65/60; H04B 7/1851; H04B 7/18513; G08G 3/00; G08G 3/02
See application file for complete search history.

(56) References Cited

U.S. PATENT DOCUMENTS

| | | | |
|---|---|---|---|
| 10,055,853 B1* | 8/2018 | Fisher | G06K 9/4628 |
| 2010/0014709 A1* | 1/2010 | Wheeler | G06K 9/0063 |
| | | | 382/103 |
| 2010/0278420 A1* | 11/2010 | Shet | G06K 9/00369 |
| | | | 382/156 |
| 2014/0320664 A1 | 10/2014 | Hyun | |
| 2015/0248586 A1 | 9/2015 | Gaidon et al. | |
| 2018/0158197 A1* | 6/2018 | Dasgupta | G05D 1/0094 |
| 2018/0203125 A1* | 7/2018 | Delay | G01S 19/03 |

OTHER PUBLICATIONS

Leal-Taixe, L., et al., "Learning by Tracking: Siamese CNN for Robust Target Association", CVF, The IEEE Conference on Computer Vision and Pattern Recognition (CVPR) Workshops, Jun. 2016, pp. 33-40.

Wang, S., et al., "Learning Optimal Parameters for Multi-target Tracking", BMVC, Sep. 2015, pp. 1-13, vol. 1, No. 2.

* cited by examiner

SURVEILLANCE SYSTEM USING DEEP NETWORK FLOW FOR MULTI-OBJECT TRACKING

RELATED APPLICATION INFORMATION

This application claims priority to provisional application Ser. No. 62/418,458 filed on Nov. 7, 2016, incorporated herein by reference. This application is related to an application entitled "Deep Network Flow for Multi-Object Tracking", and which is incorporated by reference herein in its entirety.

BACKGROUND

Technical Field

The present invention relates to object tracking, and more particularly to a surveillance system using deep network flow for multi-object tracking.

Description of the Related Art

Multi-Object Tracking (also referred to as "MOT") is the task of predicting trajectories of all object instances in a set of images (e.g., that form a video sequence). MOT is an important computer vision problem with a wide range of applications. A predominant approach to multi-object tracking is to first find potential object instances in the video with an object detector and then to associate the bounding boxes over time to form trajectories. Many association approaches can be formulated as a linear program, including the popularly used network flows. Defining good cost functions is crucial for the success of this tracking formulation. However, previous work uses either well defined but hand-crafted functions, learns cost functions only for parts of the variables or is limited to linear cost functions.

Thus, there is a need for an improved approach to multi-object tracking.

SUMMARY

According to an aspect of the present invention, a surveillance system is provided. The surveillance system includes at least one camera configured to capture a set of input images of a given target area that includes a set of objects to be tracked. The surveillance system includes a memory storing a learning model configured to perform multi-object tracking by jointly learning arbitrarily parameterized and differentiable cost functions for all variables in a linear program that associates object detections with bounding boxes to form trajectories. The surveillance system includes a processor configured to perform surveillance of the given target area to (i) detect the objects and track locations of the objects by applying the learning model to the set of input images in a surveillance task that uses the multi-object tracking, and (ii), provide a listing of the objects and the locations of the objects for surveillance task. A bi-level optimization is used to minimize a loss defined on a solution of the linear program.

According to another aspect of the present invention, a computer-implemented method is provided for surveillance using multi-object tracking system. The method includes capturing, by at least one camera, a set of input images of a given target area that includes a set of objects to be tracked. The method further includes storing, in a memory, a learning model configured to perform multi-object tracking by jointly learning arbitrarily parameterized and differentiable cost functions for all variables in a linear program that associates object detections with bounding boxes to form trajectories. The method also includes performing surveillance, by a processor, of the given target area to (i) detect the objects and track locations of the objects by applying the learning model to the set of input images in a surveillance task that uses the multi-object tracking, and (ii), provide a listing of the objects and the locations of the objects for surveillance task. A bi-level optimization is used to minimize a loss defined on a solution of the linear program.

According to yet another aspect of the present invention, a computer program product is provided for multi-object tracking. The computer program product includes a non-transitory computer readable storage medium having program instructions embodied therewith. The program instructions are executable by a computer to cause the computer to perform a method. The method includes capturing, by at least one camera, a set of input images of a given target area that includes a set of objects to be tracked. The method further includes storing, in a memory, a learning model configured to perform multi-object tracking by jointly learning arbitrarily parameterized and differentiable cost functions for all variables in a linear program that associates object detections with bounding boxes to form trajectories. The method also includes performing surveillance, by a processor, of the given target area to (i) detect the objects and track locations of the objects by applying the learning model to the set of input images in a surveillance task that uses the multi-object tracking, and (ii), provide a listing of the objects and the locations of the objects for surveillance task. A bi-level optimization is used to minimize a loss defined on a solution of the linear program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to a surveillance system using deep network flow for multi-object tracking.

It is to be appreciated that multi-object tracking in accordance with the present invention can be applied to applications including, but not limited to, any of the following: surveillance; action recognition; Advanced Driver Assistance System (ADAS), autonomous driving; video analysis; retail (e.g., tracking customer path in shopping stores, airport or train station shopping malls); smart transportation (e.g., tracking and regulating passenger or vehicle flow in airports, bus and train stations, etc.); security (monitor individuals for access control, etc.); safety (evacuating people in emergency situations, etc.), and so forth. Of course, the present invention can also be applied to a myriad of other applications, as readily appreciated by one of ordinary skill in the art given the teachings of the present invention provided herein, while maintaining the spirit of the present invention.

In accordance with an embodiment of the present invention, a novel formulation is provided to jointly learn arbitrarily parameterized but differentiable cost functions for all variables. The present invention can use bi-level optimization to minimize a loss defined on the solution of the linear program.

Experiments have demonstrated that the present invention can successfully learn all cost functions for the association problem in an end-to-end fashion, which outperforms hand-crafted cost functions in all settings. The integration and combination of various sources of inputs becomes easy and the cost functions can be learned entirely from data, alleviating the tedious work of hand-designing costs.

Figure 1:
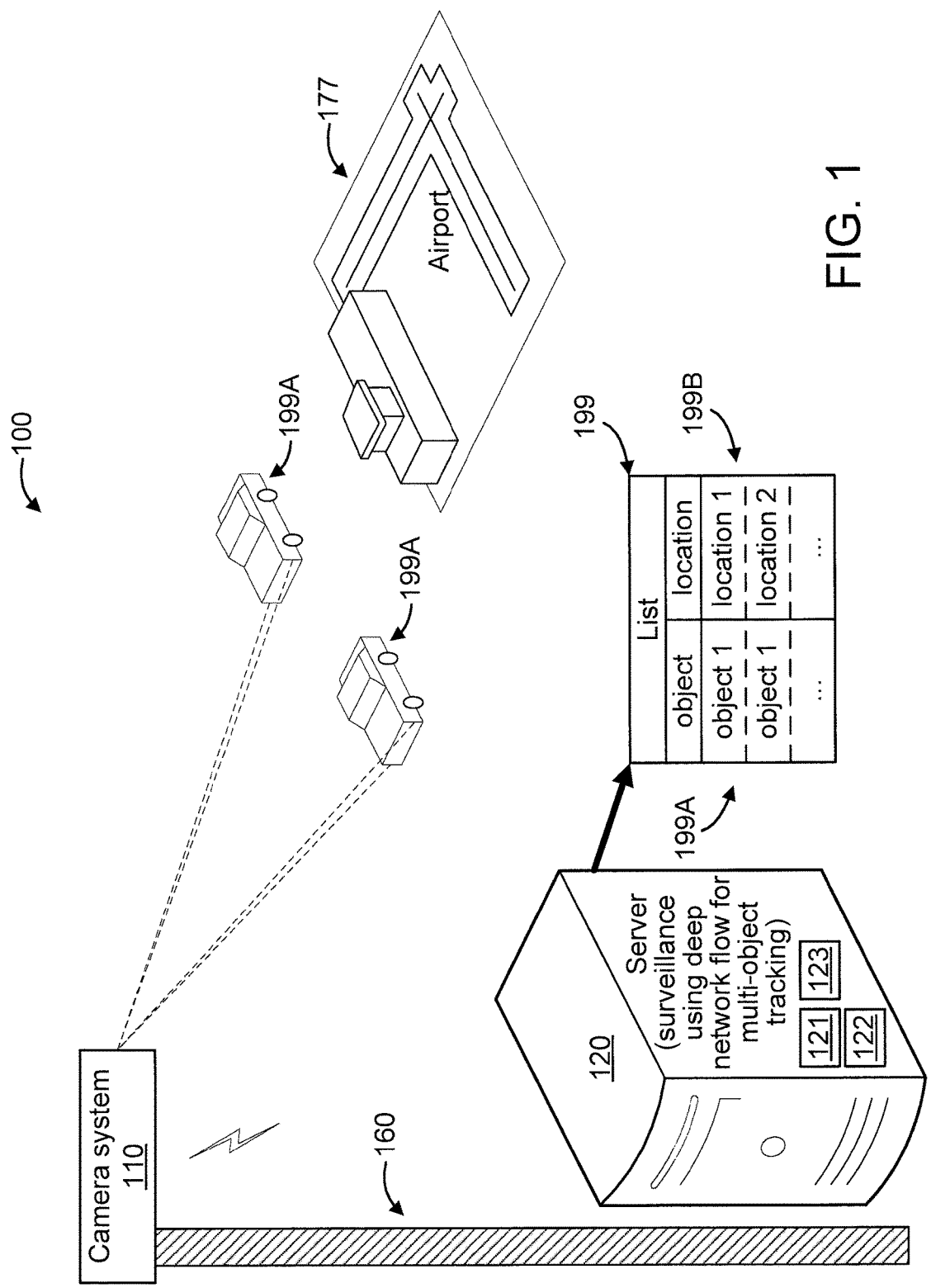
FIG. 1 shows an exemplary system for surveillance based on multi-object tracking, in accordance with an embodiment of the present principles.

FIG. 1 shows an exemplary system 100 for surveillance based on multi-object tracking, in accordance with an embodiment of the present principles.

The system 100 includes a camera system 110. While a single camera system 110 is shown in FIG. 1 for the sakes of illustration and brevity, it is to be appreciated that multiple camera systems can be also used, while maintaining the spirit of the present invention.

In the embodiment of FIG. 1, the camera system 110 is mounted on a mounting entity 160. For the sake of illustration, the mounting entity 160 is a pole. While a pole 160 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 110 can be mounted in or on any of the following: a building; and so forth. The preceding examples are merely illustrative.

The camera system 110 can be a wireless camera system having its own antenna(s) or can use one or more antennas included on the pole 160 (or other mounting entity (e.g., building, drone, etc.) to which the camera system 110 is mounted or proximate).

The system 100 further includes a server 120 configured to perform surveillance based on multi-object tracking. Such surveillance can be with respect to a secured object such as, for example, a secured facility 177. In the example of FIG. 1, the secured facility is an airport. Of course, other secured facilities can also be surveilled in accordance with the present invention. The surveillance can involve detecting the presence of multiple objects, identifying the locations of the multiple objects, identifying particular actions performed by the multiple objects, and/or performing one or more actions in response to surveillance results (e.g., in response to particular multi-object tracking/surveillance results). The locations of the multiple objects can be their current locations and/or their future locations (e.g., predicted locations, trajectories, etc.). The server 120 can be located remote from, or proximate to, the camera system 110. The server 120 can include a processor 121, a memory 122, and a wireless transceiver 123. The processor 121 and the memory 122 of the remote server 120 can be configured to perform surveillance based on images received from the camera system 110 by the (the wireless transceiver 123 of) the remote server 120. In this way, a list 199 of detected objects 199A and their locations 199B can be provided for any of a myriad of possible surveillance application uses relating to multi-object tracking. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where surveillance can prove useful such as mass transit hubs, border crossings, subways, transportation hubs, airports, ship ports, and so forth. It is to be appreciated that the preceding environments are merely illustrative and, thus, other environments can also be used, while maintaining the spirit of the present invention.

Figure 2:
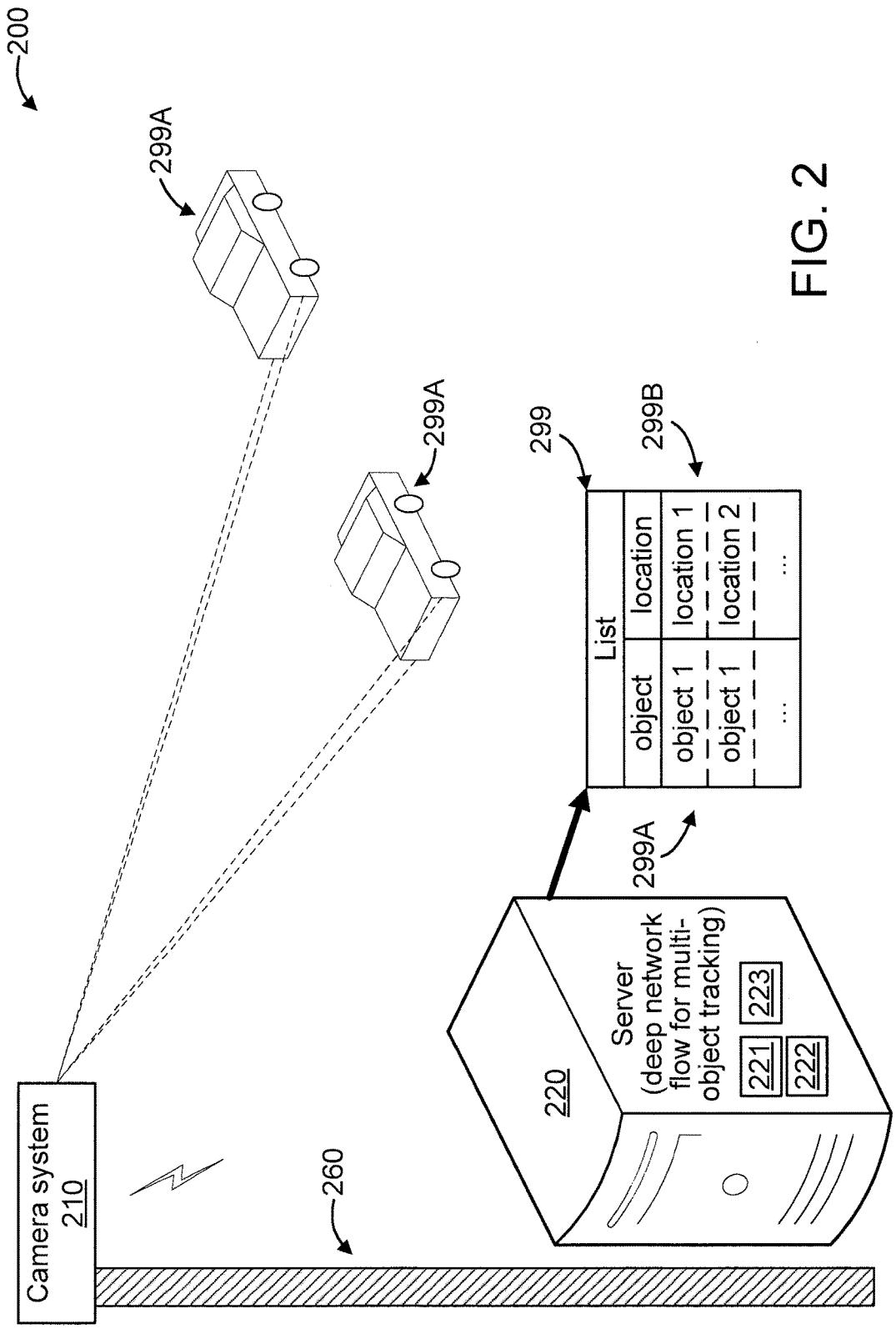
FIG. 2 shows an exemplary system for multi-object tracking, in accordance with an embodiment of the present invention.

FIG. 2 shows an exemplary system 200 for multi-object tracking, in accordance with an embodiment of the present invention.

The system 200 includes a camera system 210. While a single camera system 210 is shown in FIG. 2 for the sakes of illustration and brevity, it is to be appreciated that multiple camera systems can be also used, while maintaining the spirit of the present invention.

In the embodiment of FIG. 2, the camera system 210 is mounted on a mounting entity 260. For the sake of illustration, the mounting entity 260 is a pole. While a pole 260 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 210 can be mounted in or on any of the following: a building; a drone; a vehicle; and so forth. The preceding examples are merely illustrative.

The camera system 210 can be a wireless camera system having its own antenna(s) or can use one or more antennas included on the pole 260 (or other mounting entity (e.g., building, drone, vehicle, etc.) to which the camera system 210 is mounted or proximate).

The system 200 further includes a server 220 configured to perform multi-object tracking. The multi-object tracking can involve detecting the presence of multiple objects, identifying the locations of the multiple objects, identifying particular actions performed by the multiple objects, and/or performing one or more actions (e.g., in response to particular multi-object tracking results). The server 220 can located remote from, or proximate to, the camera system 210. The server 220 can include, e.g., a processor 221, a memory 222, and a wireless transceiver 223. The processor 221 and the memory 222 of the remove server 220 can be configured to perform multi-object tracking based on images received from the camera system 210 by the (the wireless transceiver 223 of) the remote server 220. In this way, a list 299 of detected objects 299A and their locations 299B can be provided for any of a myriad of possible application uses relating to multi-object tracking. Such application uses can involve one or more actions performed responsive to the list, as readily appreciated by one of ordinary skill in the art.

Accordingly, some exemplary suitable environments to which the present invention can be applied can include any environments where multi-object tracking can be used. For example, exemplary suitable environments include, but are not limited to, a battle field, a riot scenario, a picketing scenario, intra body objects (tumors, etc.), video analysis, and so forth.

Figure 3:
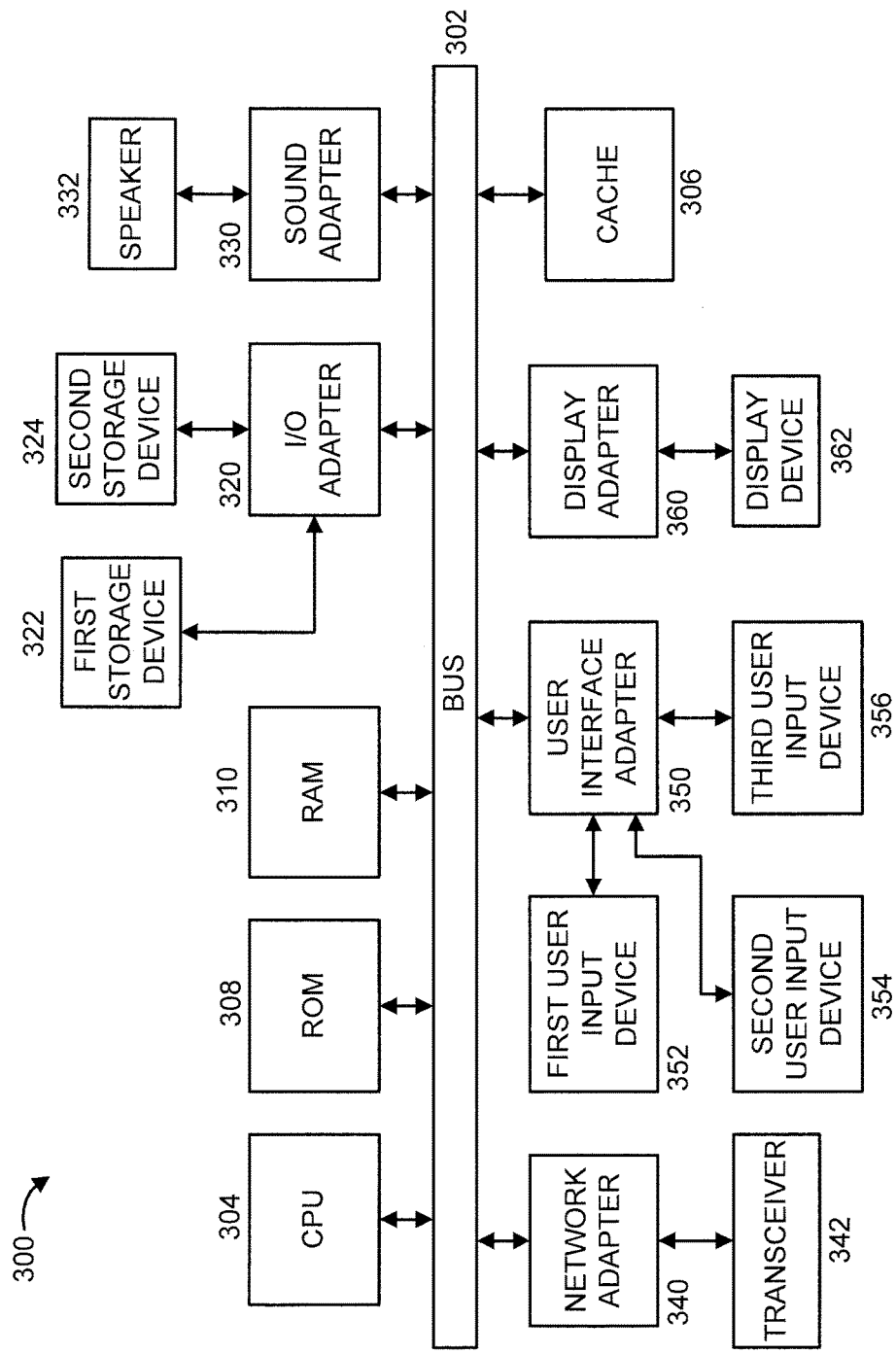
FIG. 3 shows an exemplary processing system to which the present principles may be applied, according to an embodiment of the present principles.
Figure 4:
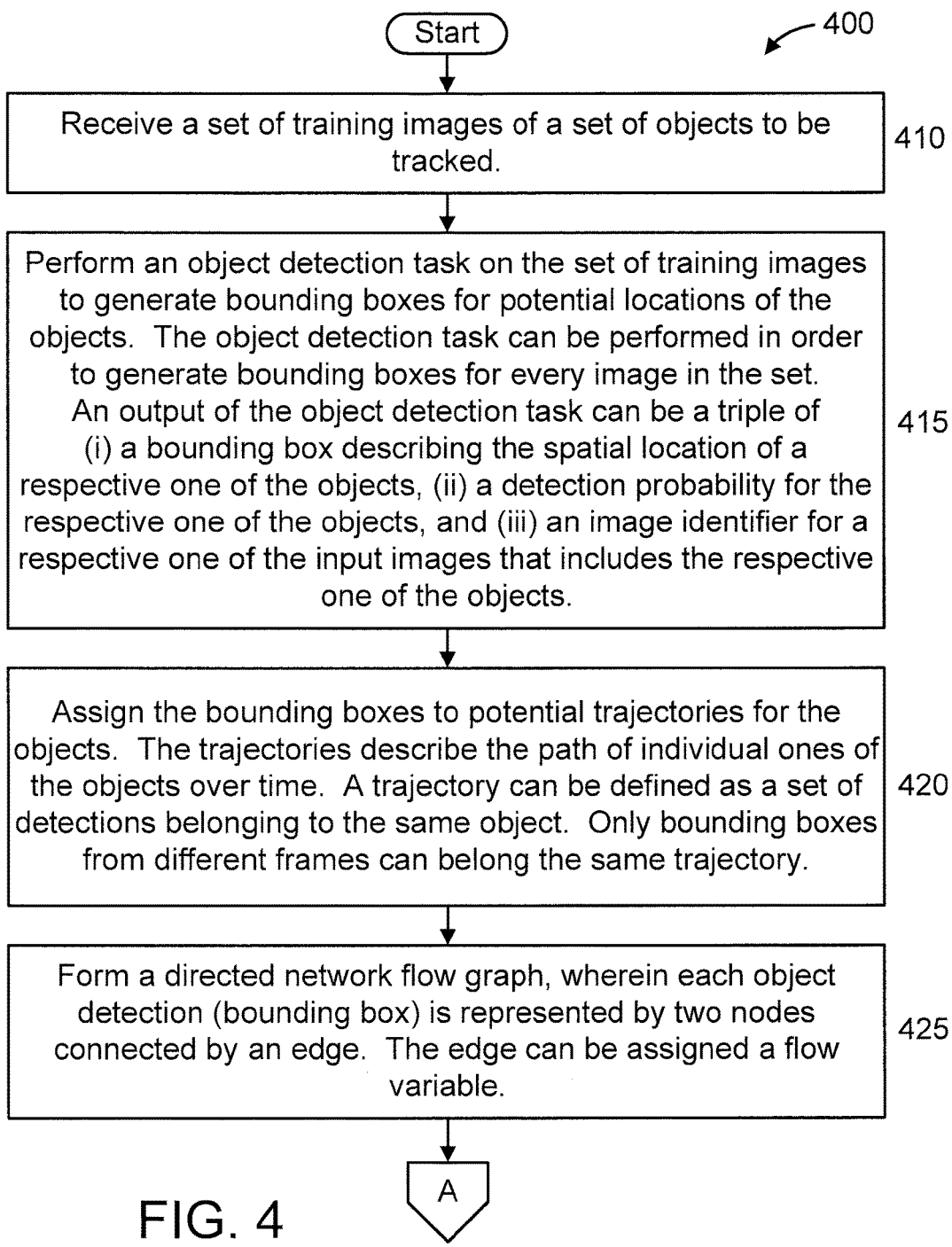
FIGS. 4-8 show an exemplary method for multi-object tracking, in accordance with an embodiment of the present principles.
Figure 5:
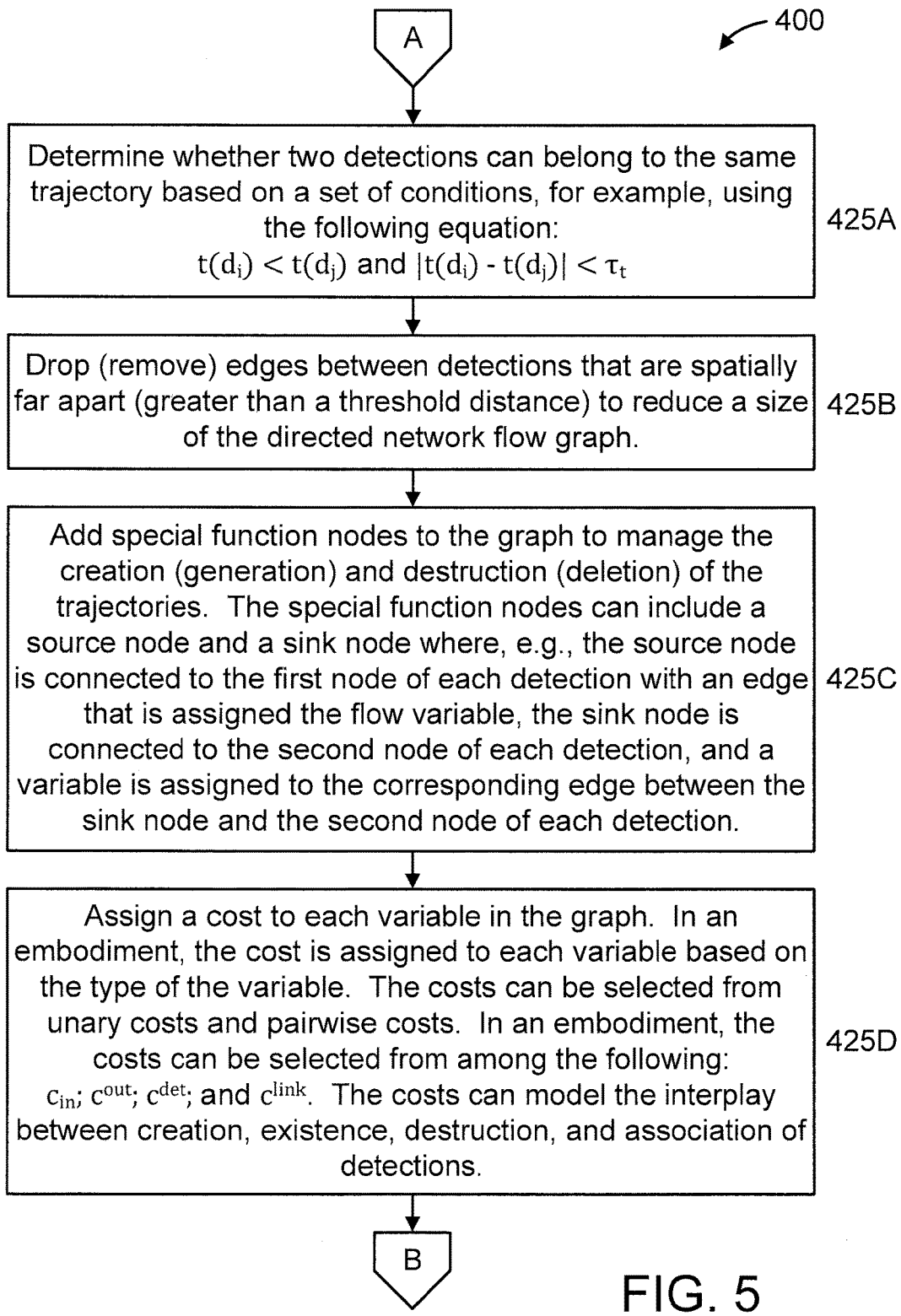
Figure 6:
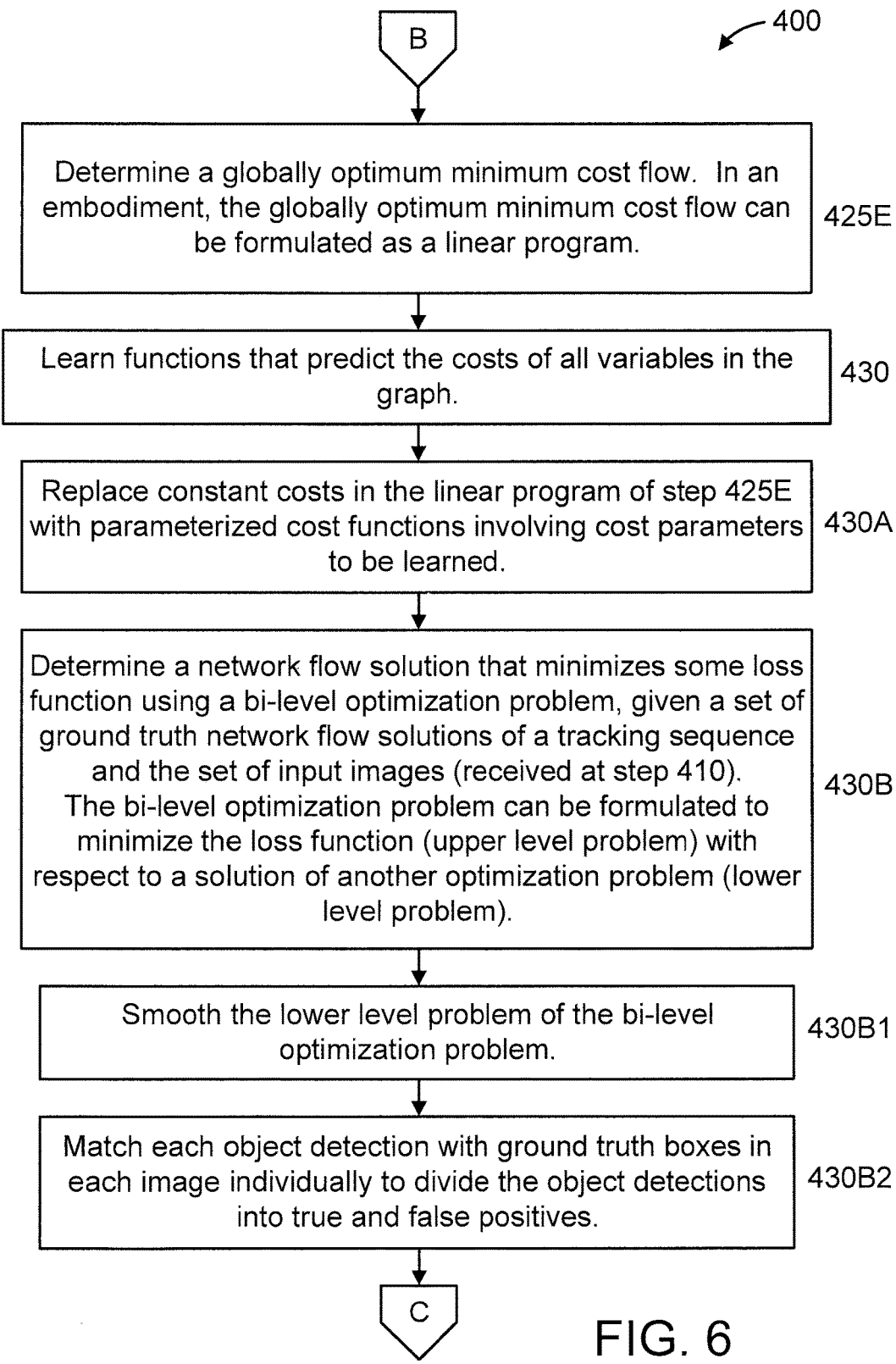
Figure 7:
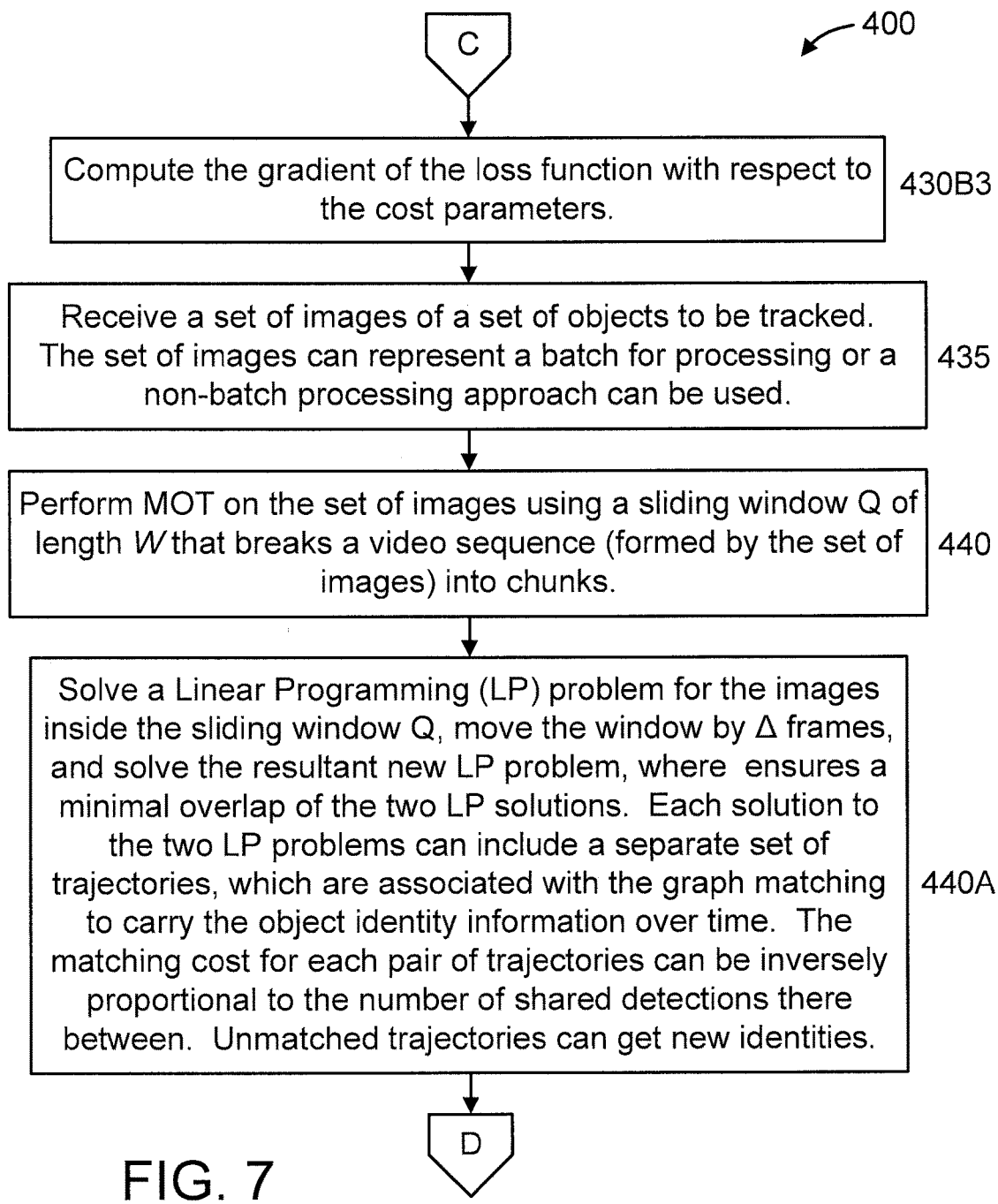
Figure 8:
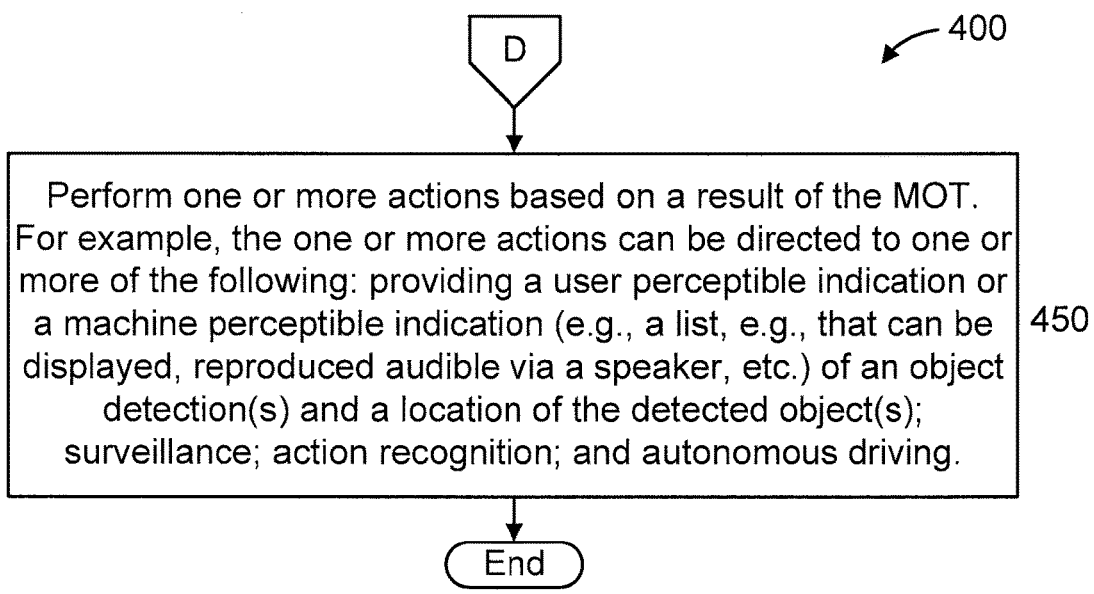

FIG. 3 shows an exemplary processing system 300 to which the present principles may be applied, according to an embodiment of the present principles. In an embodiment, the server 120 of FIG. 1 and/or the server 220 of FIG. 2 can be implemented, at least in part, by processing system 300.

The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Moreover, it is to be appreciated that system 100 described above with respect to FIG. 1 is a system for implementing respective embodiments of the present principles. Part or all of processing system 300 may be implemented in one or more of the elements of system 100. Also, it is to be appreciated that system 200 described above with respect to FIG. 2 is a system for implementing respective embodiments of the present principles. Part or all of processing system 300 may be implemented in one or more of the elements of system 200.

Further, it is to be appreciated that system 100 may perform at least part of the method described herein including, for example, at least part of method 400 of FIGS. 4-8. Similarly, part or all of system 200 may be used to perform at least part of method 400 of FIGS. 4-8. Also, part or all of system 300 may be used to perform at least part of method 400 of FIGS. 4-8.

FIGS. 4-8 show an exemplary method 400 for multi-object tracking, in accordance with an embodiment of the present principles. In an embodiment, steps 410-430 can be considered to correspond to a training phase, and steps 435-450 can be considered to correspond to a tracking phase.

At step 410, receive a set of training images of a set of objects to be tracked.

At step 415, perform an object detection task on the set of training images to generate bounding boxes for potential locations of the objects. In an embodiment, the object detection task can be performed in order to generate bounding boxes for every image in the set. In an embodiment, an output of the object detection task can be a triple of (i) a bounding box describing the spatial location of a respective one of the objects, (ii) a detection probability for the respective one of the objects, and (iii) an image identifier for a respective one of the input images that includes the respective one of the objects.

At step 420, assign the bounding boxes to potential trajectories for the objects. The trajectories describe the path of individual ones of the objects over time. In an embodiment, a trajectory can be defined as a set of detections belonging to the same object. In an embodiment, only bounding boxes from different frames can belong the same trajectory.

At step 425, form a directed network flow graph, wherein each object detection (bounding box) is represented by two nodes connected by an edge. In an embodiment, the edge can be assigned a flow variable.

In an embodiment, step 425 can include one or more of steps 425A-425E.

At step 425A, determine whether two detections can belong to the same trajectory based on a set of conditions. In an embodiment, step 425A can be implemented by the following equation:

$$t(d_i) < t(d_j) \text{ and } |t(d_i) - t(d_j)| < \tau_r.$$

At step 425B, drop (remove) edges between detections that are spatially far apart (greater than a threshold distance) to reduce a size of the directed network flow graph.

At step 425C, add special function nodes to the graph to manage the creation (generation) and destruction (deletion) of the trajectories. In an embodiment, the special function nodes can include a source node and a sink node. In an embodiment, connect the source node to the first node of each detection with an edge that is assigned the flow variable, connect the sink node to the second node of each detection, and assign a variable $x_i^{out}$ to the corresponding edge between the sink node and the second node of each detection.

At step 425D, assign a cost to each variable in the graph. In an embodiment, the cost is assigned to each variable based on the type of the variable. In an embodiment, the costs can be selected from unary costs and pairwise costs. In an embodiment, the costs can be selected from among the following: $c^{in}$; $c^{out}$; $c^{det}$; and $c^{link}$. In an embodiment, the costs can model the interplay between creation, existence, destruction, and association of detections.

At step 425E, determine a globally optimum minimum cost flow. In an embodiment, the globally optimum minimum cost flow can be formulated as a linear program. The linear program associates potential object instances in an image(s) with bounding boxes over time to form trajectories for the potential object instances. Hence, at step 425E, we already have defined how we represent detections in the graph, how the graph is constructed, and that each edge in the graph has a variable and a cost. Hence, trajectories can be found by solving the linear program that is defined by the variables and costs.

At step 430, learn functions that predict the costs of all variables in the graph.

In an embodiment, step 430 includes step 430A.

At step 430A, replace constant costs in the linear program of step 425E with parameterized cost functions involving cost parameters to be learned.

At step 430B, determine a network flow solution that minimizes some loss function using a bi-level optimization problem, given a set of ground truth network flow solutions of a tracking sequence and the set of input images (received at step 410). The bi-level optimization problem can be formulated to minimize the loss function (upper level problem) with respect to a solution of another optimization problem (lower level problem).

In an embodiment, step 430B can include one or more of steps 430B 1 and 460B2.

At step 430B 1, smooth the lower level problem of the bi-level optimization problem.

At step 430B2, match each object detection with ground truth boxes in each image individually to divide the object detections into true and false positives.

At step 430B3, compute the gradient of the loss function with respect to the cost parameters. In an embodiment the calculation of the gradient of the loss function is based on a division of the object detections into true and false positives as per step 430B2.

At step 435, receive a set of images of a set of objects to be tracked. In an embodiment, the set of images can represent a batch for processing. In another embodiment, a non-batch processing approach can be used.

At step 440, perform MOT on the set of images using a sliding window Q of length W that breaks a video sequence (formed by the set of images) into chunks.

In an embodiment, step 440 can include step 440A.

At step 440A, solve a Linear Programming (LP) problem for the images inside the sliding window Q, move the window by Δ frames, and solve the resultant new LP problem, where 0<Δ<W ensures a minimal overlap of the two LP solutions. In an embodiment, each of the solutions to the two LP problems can include a separate set of trajectories, which are associated with the graph matching to carry the object identity information over time. In an embodiment, the matching cost for each pair of trajectories can be inversely proportional to the number of shared detections there between. In an embodiment, unmatched trajectories can get new identities.

At step 450, perform one or more actions based on a result of the MOT. For example, the one or more actions can be directed to one or more of the following: providing a user perceptible indication or a machine perceptible indication (e.g., a list, e.g., that can be displayed, reproduced audible via a speaker, etc.) of an object detection(s) and a location of the detected object(s); surveillance; action recognition; and autonomous driving. The list can be a list of detected objects and their corresponding locations.

As is evident to one of ordinary skill in the art, the action(s) taken is(are) dependent upon the type of application to which the present invention is applied.

Further descriptions will now be given regarding various aspects of the present invention.

In accordance with an embodiment of the present invention, it is demonstrated that it is possible to learn features for network-flow-based data association via backpropagation, by expressing the optimum of a smoothed network flow problem as a differentiable function of the pairwise association costs. This approach is applied to multi-object tracking with a network flow formulation. The integration and combination of various sources of inputs becomes easy and the cost functions can be learned entirely from data, alleviating tedious hand-designing of costs.

In an embodiment, the present invention provides a novel formulation that allows for learning arbitrary parameterized cost functions for all variables of the association problem in an end-to-end fashion, i.e., from input data to the solution of the LP. By smoothing the LP, bi-level optimization enables learning of all the parameters of the cost functions such as to minimize a loss that is defined on the solution of the association problem. A benefit of this formulation is its flexibility, general applicability to many problems and the avoidance of tedious hand-crafting of cost functions. The approach of the present invention is not limited to log-linear models, but can take full advantage of any differentiable parameterized function, e.g., neural networks, to predict costs. Indeed, the formulation of the present invention can be integrated into any deep learning framework as one particular layer that solves a linear program in the forward pass and back-propagates gradients with respect to the costs through its solution.

It is to be appreciated that while the present invention is general and can thus be used for many association problems, its use for multi-object tracking with a network flow formulation is described herein as an exemplary target application to which the present invention can be applied. In an embodiment, the present invention enables end-to-end learning of cost functions for the network flow problem. In an embodiment, the present invention integrates different types of input sources like bounding box information, temporal differences, appearance and motion features easily whereby all model parameters can be learned jointly. It is to be appreciated that the end-to-end learned cost functions of the present invention outperform hand-crafted functions without the need to hand-tune parameters.

A description will now be given regarding deep network flows for tracking, in accordance with an embodiment of the present invention.

In an embodiment, the present invention is described with respect to an end-to-end formulation for association problems using the example of network flows for multi-object tracking. In particular, a tracking-by detection framework is considered, where potential detections d in every frame t of a video sequence are given. Each detection consists of a bounding box b(d) describing the spatial location, a detection probability p(d) and a frame number t(d). For each detection, the tracking algorithm needs to either associate it with an object trajectory $T_k$ or reject it. A trajectory is defined as a set of detections belonging to the same object, i.e., $T_k = \{d_k^1, \ldots, d_k^{N_k}\}$, where $N_k$ defines the size of the trajectory. Only bounding boxes from different frames can belong to the same trajectory. The number of trajectories |T| is unknown and needs to be inferred as well.

Herein, for the sake of illustration, a particular network flow formulation is used to solve the association problem. It is a popular choice that works well in practice and can be solved via linear programming (LP). Note that bipartite graph matching, which is typically used for on-line trackers, can also be formulated as a network flow, making our learning approach equally applicable.

A description will now be given regarding a network flow formulation, in accordance with an embodiment of the present invention.

Figure 9:
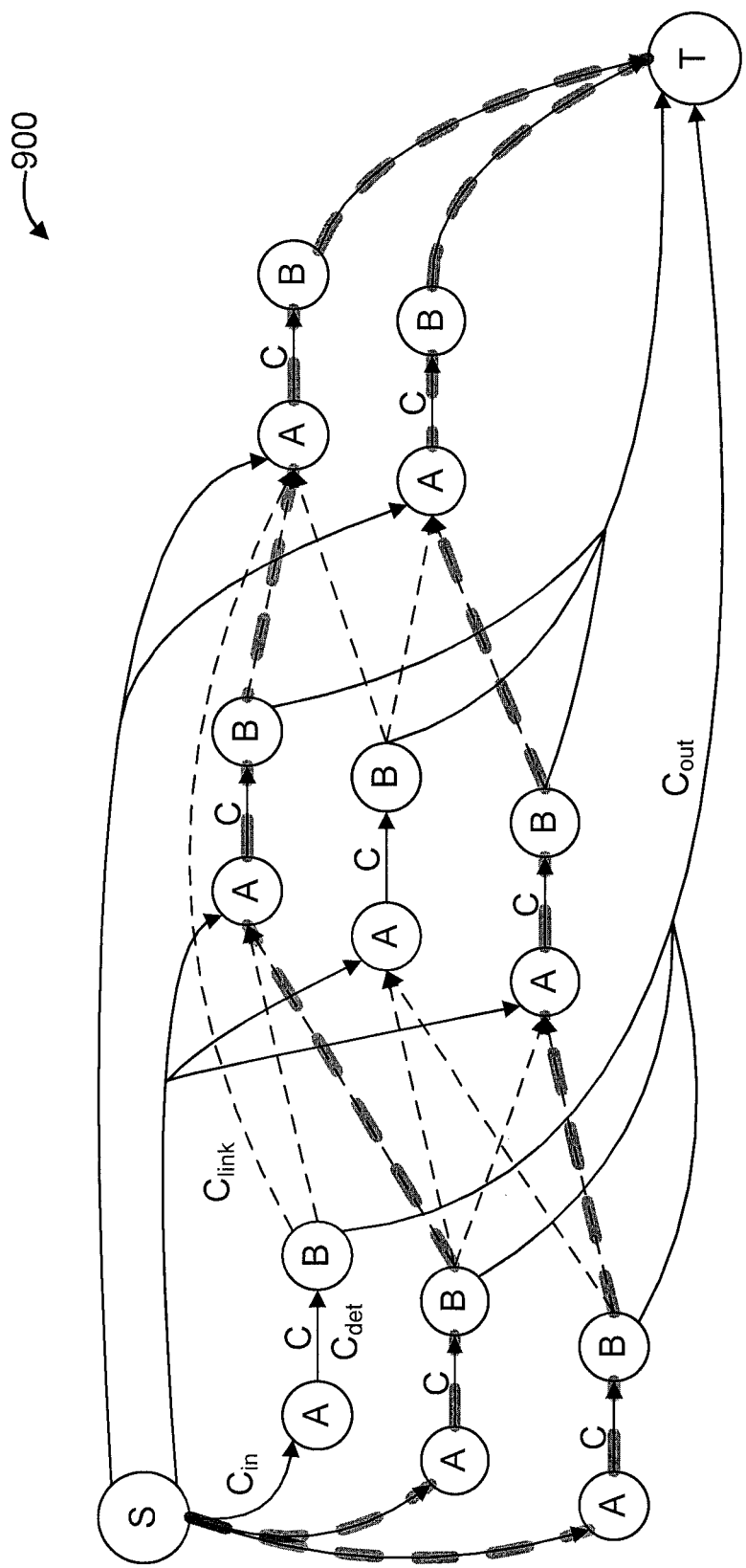
FIG. 9 shows a directed network flow graph, in accordance with an embodiment of the present invention.

A formulation of a directed network flow graph 900 will now be described with an example illustrated in FIG. 9. Each detection $d_i$ is represented with two nodes A, B (depicted by respective circles having an "A" and a "B" disposed therein) connected by an edge C (depicted by a line having a C there over). This edge C is assigned the flow variable $x_i^{det}$. To be able to associate two detections, meaning they belong to the same trajectory T, directed edges (depicted using a thin dashed line) from all $d_i$ (second node) to all $d_j$(first node) are added to the graph if $t(d_i) < t(d_j)$ and $|t(d_i) - t(d_j)| < T_t$. Each of these edges is assigned a flow variable $x_{i,j}^{link}$. Having edges over multiple frames allows for handling occlusions or missed detections. To reduce the size of the graph, we drop edges between detections that are spatially far apart. This choice relies on the smoothness assumption of objects in videos and does not hurt performance but reduces inference time. In order to handle birth and death of trajectories, two special nodes are added to the graph. A source node (S) is connected with the first node of each detection di with an edge (depicted using a thin solid line) that is assigned the flow variable $x_i^{in}$. Similarly, the second node of each detection is connected with a sink node (T) and the corresponding edge (depicted using a thin solid line) is assigned the variable $x_i^{out}$. The thick dashed lines represent the solution of the network flow (see further below), in accordance with an embodiment of the present invention.

Each variable in the graph is associated with a cost. For each of the four variable types we define the corresponding cost, i.e., $c^{in}$, $c^{out}$, $c^{det}$ and $c^{link}$. For ease of explanation later, we differentiate between unary costs $c^U$ ($c^{in}$, $c^{out}$ and $c^{det}$) and pairwise costs $c^P$ ($c^{link}$). Finding the globally optimal minimum cost flow can be formulated as the linear program as follows:

$$x^* = \mathrm{argmin}_x c^\top x \qquad (1)$$
$$\text{s.t.} \quad Ax \leq b, Cx = 0,$$

where $x \in \mathbb{R}^M$ and $c \in \mathbb{R}^M$ are the concatenations of all flow variables and costs, respectively, and M is the problem dimension. Note that we already relaxed the actual integer constraint on x with box constraints $0 \leq x \leq 1$, modeled by $A = [I, -I]^T \in \mathbb{R}^{2M \times M}$ and $b = [1,0]^T \in \mathbb{R}^{2M}$ in (1). The flow conservation constraints, $x_i^{in} + \Sigma_j x_{ji}^{link} = x_i^{det}$ and variable $x_i^{out} + \Sigma_j x_{ij}^{link} = x_i \forall i$, are modeled with $C \in \mathbb{R}^{2K \times M}$ where K is the number of detections. The thick dashed lines in FIG. 9 illustrate $x^*$.

The most crucial part in this formulation is to find proper costs c that model the interplay between birth, existence, death and association of detections. The final tracking result mainly depends on the choice of c.

A description will now be given regarding end-to-end learning of cost functions, in accordance with an embodiment of the present invention.

A contribution of the present invention is a flexible framework to learn functions that predict the costs of all variables in the network flow graph. Learning can be done end-to-end, i.e., from the input data all the way to the solution of the network flow problem. To do so, we replace the constant costs c in Equation (1) with parameterized cost functions $c(f, \Theta)$, where $\Theta$ are the parameters to be learned and f is the input data. For the task of MOT, the input data typically are bounding boxes, detection scores, images features, or more specialized and effective features like ALFD.

Given a set of ground truth network flow solutions $x^{gt}$ of a tracking sequence and the corresponding input data f, we want to learn the parameters $\Theta$ such that the network flow solution minimizes some loss function. This can be formulated as the bi-level optimization problem as follows:

$$\mathrm{argmin}_\Theta \mathcal{L}(x^{gt}, x^*) \qquad (2)$$
$$\text{s.t.} \quad x^* = \mathrm{argmin}_x c(f, \Theta)^\top x$$
$$Ax \leq b, Cx = 0,$$

which tries to minimize the loss function $\mathcal{L}$ (upper level problem) with respect to the solution of another optimization problem (lower level problem), which is the network flow in our case, i.e., the inference of the tracker. To compute gradients of the loss function with respect to the parameters $\Theta$, a smooth lower level problem is used. The box constraints, however, render it non-smooth.

A description will now be given regarding smoothing the lower level problem, in accordance with an embodiment of the present invention.

The box constraints in Equations (1) and (2) can be approximated via log-barriers. The inference problem then becomes the following:

$$x^* = \mathrm{argmin}_x t \cdot c(f, \Theta)^\top x - \sum_{i=1}^{2M} \log(b_i - a_i^\top x) \qquad (3)$$
$$\text{s.t.} \quad Cx = 0,$$

where t is a temperature parameter (defining the accuracy of the approximation) and $a_i^T$ are rows of A. Moreover, we can get rid of the linear equality constraints with a change of basis $x = x(z) = x_0 + Bz$, where $Cx_0 = 0$ and $B = \mathcal{N}(C)$, i.e., the null space of C, making our objective unconstrained in z ($Cx = Cx_0 + CBz = Cx_0 = 0 = $True $\forall z$). This results in the following unconstrained and smooth lower level problem:

$$\mathrm{argmin}_z t \cdot c(f, \Theta)^\top x(z) + P(x(z)), \qquad (4)$$
$$\text{where } P(x) = -\sum_{i=1}^{2M} \log(b_i - a_i^\top x).$$

A description will now be given regarding gradients with respect to costs, in accordance with an embodiment of the present invention.

Given the smoothed lower level problem (4), we can define the final learning objective as follows:

$$\mathrm{argmin}_\Theta \mathcal{L}(x^{gt}, z^*)) \qquad (5)$$
$$\text{s.t.} \quad z^* = \mathrm{argmin}_z t \cdot c(f, \Theta)^\top x(z) + P(x(z)),$$

which is now well-defined. We are interested in computing the gradient of the loss $\mathcal{L}$ with respect to the parameters $\Theta$ of our cost function $c(\cdot; \Theta)$. It is sufficient to show $$\frac{\partial \mathcal{L}}{\partial c},$$

as gradients for the parameters Θ can be obtained via the chain rule assuming c(·; Θ) is differentiable with respect to Θ.

The basic idea for computing gradients of problem (5) is to make use of implicit differentiation on the optimality condition of the lower level problem. For an uncluttered notation, we drop all dependencies of functions in the following. We define the desired gradient via chain rule as follows:

$$\frac{\partial L}{c} = \frac{\partial z^*}{\partial c} \frac{\partial x}{\partial z^*} \frac{\partial \mathcal{L}}{\partial x} = \frac{\partial z^*}{\partial c} B^\top \frac{\partial \mathcal{L}}{\partial x}; \qquad (6)$$

We assume the loss function L to be differentiable with respect to x. To compute $$\frac{\partial z^*}{\partial c},$$

we use the optimality condition of (4) as follows:

$$0 = \frac{\partial}{\partial z}[t \cdot C^\top x + P] \qquad (7)$$
$$= t \cdot \frac{\partial x}{\partial z} c + \frac{\partial x}{\partial z} \frac{\partial P}{\partial x} = t \cdot B^\top c + B^\top \frac{\partial P}{\partial x}$$

and differentiate with respect to c, which gives $$0 = \frac{\partial}{\partial c}[t \cdot B^\top c] + \frac{\partial}{\partial c}\left[B^\top \frac{\partial P}{\partial x}\right] \qquad (8)$$
$$= t \cdot B \frac{\partial z}{\partial c} \frac{\partial x}{\partial z} B = t \cdot B + \frac{\partial z}{\partial c} B^\top \frac{\partial^2 P}{\partial x^2} B$$

and which can be rearranged to $$\frac{\partial z}{\partial c} = -t \cdot B \left[B^\top \frac{\partial^2 P}{\partial x^2} B\right]^{-1} \qquad (9)$$

The final derivative can then be written as follows:

$$\frac{\partial \mathcal{L}}{c} = -t \cdot B \left[B^\top \frac{\partial^2 P}{\partial x^2} B\right]^{-1} B^\top \frac{\partial \mathcal{L}}{\partial x} \qquad (10)$$

To fully define (10), we provide the second derivative of P with respect to x, which is given as follows:

$$\frac{\partial^2 P}{\partial x^2} = \frac{\partial^2 P}{\partial x \partial x^\top} = \sum_{1=i}^{2M} \frac{1}{(b_i - a_i^\top x)^2} \cdot a_i a_i^\top \qquad (11)$$

Hereinafter, it is shown that $$B^\top \frac{\partial^2 P}{\partial x^2}$$

B is always invertible.

Training requires to solve the smoothed linear program (4), which can be done with any convex solver. This is essentially one step in a path-following method with a fixed temperature t. We set $$t = \frac{M}{\in},$$

where ∈ is a hyper-parameter defining the approximation accuracy of the log barriers. We tried different values for ∈ and also an annealing scheme, but the results seem insensitive to this choice. We found ∈=0.1 to work well in practice.

It is also important to note that our formulation is not limited to the task of MOT. It can be employed for any application where it is desirable to learn costs functions from data for an association problem, or, more generally, for a linear program with the assumptions given herein. Our formulation can also be interpreted as one particular layer in a neural network that solves a linear program.

A description will now be given regarding defining ground truth and the loss function, in accordance with an embodiment of the present invention.

To learn the parameters Θ of the cost functions we need to compare the LP solution x* with the ground truth solution $x^{gt}$ in a loss function $\mathcal{L}$. Basically, $x^{gt}$ defines which edges in the network flow graph should be active ($x_i^{gt}=1$) and inactive ($x_i^{gt}=0$). Training data needs to contain the ground truth bounding boxes (with target identities) and the detection bounding boxes. The detections define the structure of the network flow graph.

To generate $x^{gt}$, we first match each detection with ground truth boxes in each frame individually. Similar to the evaluation of object detectors, we match the highest scoring detection having an intersection-over-union overlap larger 0:5 to each ground truth bounding box. This divides the set of detection into true and false positives and already defines the ground truth for $x^{det}$. In order to provide ground truth for associations between detections, i.e., $x^{link}$, we iterate the frames sequentially and investigate all edges pointing forward in time for each detection. We activate the edge that points to the closest true positive detection in time, which has the same target identity. All other $x^{link}$ edges are set to 0. After all ground truth trajectories are identified, it is straightforward to set the ground truth of $x^{in}$ and $x^{out}$.

There exists different types of links that should be treated differently in the loss function. There are edges $x^{link}$ between two false positives (FPFP), between true and false positives (TP-FP), and between two true positives with the same (TP-TP+) or a different (TP-TP-) identity. For (TP-TP+) links, we also differentiate between the shortest links for the trajectory and links that are longer (TP-TP+Far). Edges associated with a single detection ($x^{in}$, $x^{det}$ and $x^{out}$) are either true (TP) or false positives (FP). To trade-off the importance between these types, we define the following weighted loss function:

$$\mathcal{L}(x^*, x^{gt}) = \sum_{\kappa \in \{in, det, out\}} \sum_i \omega_i (x_i^{\kappa, *} - x_i^{gt})^2 + \sum_{i,j \in \varepsilon} \omega_{ij} (x_{i,j}^{link, *} - x_{i,j}^{gt})^2 \quad (12)$$

where ε is the set of all edges between detections i and j. Note that the weights can be adjusted for each variable separately. The default value for the weights is 1, but we can adjust them to incorporate three intuitions about the loss, as follows:

(i) Ambiguous edges: Detections of an (FP–FP) link may describe a consistently tracked but wrong object. Also, detections of a (TP–TP+Far) link are obviously very similar. In both cases the ground truth variable is still inactive. It may hurt the learning procedure if a wrong prediction is penalized too much for these cases. Thus, we can set $\omega_{ij} = \omega_{amb} < 1$.

(ii) To influence the trade-off between precision and recall, we define the weight $\omega_{pr}$ for all edges involving a true positive detection. Increasing $\omega_{pr}$ favors recall.

(iii) To emphasize associations, we additionally weight all $x^{link}$ variables with $\omega^{link}$. If multiple of these cases are true for a single variable, we multiply the weights.

A different weighting scheme and an $l_1$ loss can also be used.

A description will now be given regarding a tracking model, in accordance with an embodiment of the present invention.

After the training phase, the above described network flow formulation can be readily applied for tracking. One option is to batch process whole sequences at once, which, however, does not scale to long sequences. As we focus on the learning phase in this paper, we opt for a simple approach, which empirically gives similar results to batch processing but does not come with guarantees.

We use a temporal sliding window of length W that breaks a video sequence into chunks. We solve the LP problem for the frames inside the window, move it by Δ frames and solve the new LP problem, where 0<Δ<W ensures a minimal overlap of the two solutions. Each solution contains a separate set of trajectories, which we associate with bipartite graph matching to carry the object identity information over time. The matching cost for each pair of trajectories is inversely proportional to the number of detections they share. Unmatched trajectories get new identities.

In practice, we use maximal overlap, i.e., Δ=1, to ensure stable associations of trajectories between two LP solutions. For each window, we output the detections of the middle frame, i.e., looking $$\frac{W}{2}$$

frames into future and past. Note that using detections from the latest frame as output enables on-line processing.

A description will now be given regarding details on the formulation of deep network flows, in accordance with an embodiment of the present invention.

First, we provide further details of our formulation of deep network flows and for computing gradients of the linear programming solution with respect to the cost functions.

A description will now be given regarding the null space of C being large than the trivial solution 0, in accordance with an embodiment of the present invention.

Herein, we smooth the lower level problem, i.e., the linear program. We get rid of the box constraints with log-barriers and remove the flow conservation constraints (matrix C) with a change of basis, which requires the null space of C. The matrix $C \in \mathbb{R}^{2K \times M}$ models the flow conservation constraints as follows:

$$x_i^{in} + \sum_j x_{ji}^{link} = x_i^{det} \quad (13)$$

$$x_i^{out} + \sum_j x_{ij}^{link} = x_i^{det}$$

for each detection i=1, ..., K. The dimensionality of the linear program is M=3K+|ε|, where ε is the set of all edges between detections, i.e., xlink. The right singular vectors of C with corresponding 0 singular values define the null space of C. The null space contains only the trivial solution 0, if all columns of C are linearly independent. However, since the rank of C is at most 2K, we have at least K+|ε| singular vectors with a singular value of 0.

A description will now be given regarding the bi-level formulation for computing gradients of the loss function with respect to the network flow costs, in accordance with an embodiment of the present invention.

Herein, we directly use implicit differentiation on the optimality condition of the lower level problem to compute the gradients of the loss function $\mathcal{L}$ with respect to the costs c of the network flow problem, i.e.

$$\frac{\partial \mathcal{L}}{\partial c}.$$

For a more detailed derivation, we again define the bi-level problem from the main paper as follows:

$$\mathcal{L}(x(z^*(c))x^{gt}) \text{ s.t. } z^*(c) = \arg\min_z E(z, c) \quad (14)$$

with $$E(z, c) = t \cdot c^\top x(z) + P(x(z)) \quad (15)$$

and $$P(x(z)) = -\sum_{i=1}^{2M} \log(b_i - a_i^\top x(z)) \quad (16)$$

For an uncluttered notation, we omit the dependency of c on Θ, which are the actual parameters of the cost functions to be learned. Note that computing $$\frac{\partial c}{\partial \Theta}$$

is essentially back-propagation of a neural network, which we use as cost functions, and $$\frac{\partial \mathcal{L}}{\partial \Theta}$$

is computed easily via the chain rule as $$\frac{\partial \mathcal{L}}{\partial \Theta} = \frac{\partial \mathcal{L}}{\partial \Theta} \cdot \frac{\partial \mathcal{L}}{\partial c}$$

Using the optimality condition of the lower level problem (15) and Lagrange multipliers $\lambda$, we bring problem (14) into its unconstrained form $$\mathcal{L}\mathcal{G}(z, c, \lambda) = \mathcal{L}(x(z^*(c)), x^{gt}) + \lambda^T \cdot \frac{\partial E(z, c)}{\partial z} \quad (17)$$

with new optimality conditions $$\frac{\partial \mathcal{L}\mathcal{G}(z, c, \lambda)}{\partial z} = 0 = \frac{\partial \mathcal{L}}{\partial z} + \frac{\partial^2 E(z, c)}{\partial z^2} \cdot \lambda \quad (18)$$

$$\frac{\partial \mathcal{L}\mathcal{G}(z, c, \lambda)}{\partial c} = 0 = \frac{\partial^2 E(z, c)}{\partial c \partial z} \cdot \lambda \quad (19)$$

$$\frac{\partial \mathcal{L}\mathcal{G}(z, c, \lambda)}{\partial \lambda} = 0 = \frac{\partial E(z, c)}{\partial z} \quad (20)$$

The last optimality condition (20) is fulfilled by solving the linear program (LP), i.e., the network flow. By using the first condition (18) we can compute the Lagrange multipliers as $$\lambda = -\left[\frac{\partial^2 E(z, c)}{\partial z^2}\right]^{-1} \cdot \frac{\partial \mathcal{L}}{\partial z} = -H_E^{-1} \cdot \frac{\partial \mathcal{L}}{\partial z} \quad (21)$$

where $H_E$ is the Hessian of the lower level problem (15). Finally, we can define the gradients of the original problem with respect to the costs c as $$\frac{\partial \mathcal{L}\mathcal{G}(z, c, \lambda)}{\partial c} = -\frac{\partial^2 E(z, c)}{\partial c \partial z} \cdot H_E^{-1} \cdot \frac{\partial \mathcal{L}}{\partial z} \quad (22)$$

Finally, we define each of the three terms in (22) in more detail. Based on this first derivative of the lower level problem $$\frac{\partial E(z, c)}{\partial z} = t \cdot \frac{\partial x(z)}{\partial z} \cdot c + \frac{\partial x(z)}{\partial z} \cdot \frac{\partial P(x(z))}{\partial x(z)} \quad (23)$$

$$= t \cdot B^T \cdot c + B^T \frac{\partial P x(z)|}{\partial x(z)}$$

$$= B^T \left[t \cdot c + \frac{\partial P(x(z))}{\partial x(z)}\right]$$

$$\frac{\partial^2 E(z, c)}{\partial c \partial z} = \left[\frac{\partial}{\partial c} t \cdot c + \frac{\partial}{\partial c} \frac{\partial P(x(z))}{\partial x(z)}\right] B \quad (24)$$

$$= [t \cdot I + 0] B$$

$$= t \cdot B$$

-continued $$\frac{\partial^2 E(z, c)}{\partial z^2} = \left[\frac{\partial}{\partial z} t \cdot c + \frac{\partial}{\partial z} \frac{\partial P(x(z))}{\partial x(z)}\right] B \quad (25)$$

$$= \left[0 + \frac{\partial x(z)}{\partial z} \cdot \frac{\partial^2 P(x(z))}{\partial x(z)^2}\right] B$$

$$= B^T \frac{\partial^2 P(x(z))}{\partial x(z)^2} B$$

and $$\frac{\partial \mathcal{L}}{\partial z} = \frac{\partial x(z)}{\partial z} \cdot \frac{\partial \mathcal{L}}{x(z)} = B^T \cdot \frac{\partial \mathcal{L}}{x(z)} \quad (26)$$

we can define
where I is the identity matrix. This gives the same solution as in the main paper, i.e., $$\frac{\partial \mathcal{L}}{\partial c} = -t \cdot B\left[B^T \frac{\partial^2 P(x(z))}{\partial x(z)^2} B\right]^{-1} B^T \cdot \frac{\partial \mathcal{L}}{x(z)} = -t \cdot B H_E^{-1} B^T \cdot \frac{\partial \mathcal{L}}{x(z)} \quad (27)$$

A description will now be given regarding the Hessian of the lower level problem always being invertible.

The Hessian of the lower level problem (15) (again, with dependencies of functions omitted for an uncluttered notation) is given as $$H_E = \frac{\partial^2 E}{\partial z^2} = B^T \cdot \frac{\partial^2 P}{\partial x^2} \cdot B = B^T \left[\sum_{i=1}^{2M} \frac{1}{(bi - a_i^T x)^2} \cdot a_i a_i^T\right] B \quad (28)$$

where $a_i^T$ are the rows of $A=[I, -I]^T$ (with I the identity matrix) and $b_i$ are the values of the vector $b=[I, 0]^T$. Defining $e_i$ as the unit vector with value 1 at dimension i and 0 elsewhere, we can see that $a_i=e_i$ for $i \leq M$, $a_i=-e_{i-M}$ for $i>M$, $b_i=1$ for $i \leq M$ an $b_i=0$ for $i>M$. Since $a_i a_i^T = e_i e_i^T = -e_i \cdot e_i^T$, we can write $$\sum_{i=1}^{2M} \frac{1}{(bi - a_i^T x)^2} \cdot a_i a_i^T = \sum_{i=1}^{M} (1 - e_i^T x)^{-2} \cdot e_i e_i^T + (0 + e_i^T x)^{-2} \cdot e_i e_i^T = \quad (29)$$

$$\sum_{i=1}^{M} ((1 - x_i)^{-2} + x_i^{-2}) \cdot e_i e_i^T = \text{diag}[(1 - x_i)^{-2} + x_i^{-2}] = D$$

where $x_i$ is the value of x at dimension i and $\text{diag}[\cdot]$ creates a diagonal matrix. Since we have $x_i \in (0,1)$ because of the log barriers, all values of D are positive and finite and we can write the Hessian as $$B^T D B = B^T D^{1/2} \cdot D^{1/2} B = \hat{B}^T \hat{B} \quad (30)$$

The rank of $D^{1/2} \in \mathbb{R}^{M \times M}$ is M and the rank of $B \in \mathbb{R}^{M \times L}$ is $L=K+|\varepsilon|$. Via matrix rank properties (e.g., Sylvester's rank inequality), $\hat{B}$ and also its Gram matrix have rank L, which means the Hessian $$\frac{\partial^2 E}{\partial z^2}$$

$\in \mathbb{R}^{L \times L}$ has full rank.

A description will now be given regarding on-line tracking, in accordance with an embodiment of the present invention.

As noted herein, the tracking model of the present invention can process a video sequence on-line, i.e., without taking future frames into account. It has been shown that the on-line version of the tracking model only shows a moderate drop in performance and mainly affects the recall (REC and MT). However, the on-line version enables many applications that require strict on-line processing of streaming data, e.g., autonomous driving.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A surveillance system, comprising:
    at least one camera configured to capture a set of input images of a given target area that includes a set of objects to be tracked;
    a memory storing a learning model configured to perform multi-object tracking by jointly learning arbitrarily parameterized and differentiable cost functions for all variables in a linear program that associates object detections with bounding boxes to form trajectories; and
    a processor configured to perform surveillance of the given target area to (i) detect the objects and track locations of the objects by applying the learning model to the set of input images in a surveillance task that uses the multi-object tracking, and (ii), provide a listing of the objects and the locations of the objects for surveillance task,
    wherein a bi-level optimization is used to minimize a loss defined on a solution of the linear program.

2. The surveillance system of claim 1, wherein the processor is further configured to generate output triples for the surveillance task, each of the output triples consisting of (i) a bounding box describing the spatial location of a respective one of the objects, (ii) a detection probability for the respective one of the objects, and (iii) an image identifier for a respective one of the input images that includes the respective one of the objects.

3. The surveillance system of claim 1, wherein each of the trajectories comprises a set of detections belonging to a same one of the objects.

4. The surveillance system of claim 1, wherein the linear program associates the bounding boxes from different ones of the input images with a same trajectory while preventing any two bounding boxes from any same one of the input images from belonging to the same trajectory.

5. The surveillance system of claim 1, wherein the processor is further configured to form a directed network flow graph, wherein each of the object detections, implemented by a respective one of the bounding boxes assigned thereto, is respectively represented by a first node and a second node connected by an edge that, in turn, is assigned to a flow variable.

6. The surveillance system of claim 5, wherein the processor is further configured to prune, from the directed network flow graph, any edges between any two of the object detections that are spatially far apart more than a threshold distance, to reduce a size of the directed network flow graph.

7. The surveillance system of claim 5, wherein the processor is further configured to add special function nodes to the directed network flow graph to manage trajectory creation and trajectory deletion.

8. The surveillance system of claim 7, wherein the special function nodes comprise a source node connected to the first node of each of the object detections, and a sink node connected to the second node of each of the object detections.

9. The surveillance system of claim 5, wherein the processor is further configured to assign a cost to each of a plurality of variables in the directed network flow graph based on a variable type.

10. The surveillance system of claim 1, wherein the learning model jointly learns the arbitrarily parameterized and differentiable cost functions by replacing constant costs in the linear program with parameterized cost functions involving cost parameters to be learned.

11. The surveillance system of claim 1, wherein the bi-level optimization is formulated as bi-level optimization problem comprising an upper level problem directed to minimizing the loss defined on the solution of the linear program and a lower level problem directed to solving a network flow optimization problem relating to object tracking inferences.

12. The surveillance system of claim 11, wherein the processor is further configured to smooth the lower level program of the bi-level optimization problem in preparation for gradient computation for the learning model.

13. The surveillance system of claim 1, wherein the processor is further configured to detect the objects and track the locations of the objects by solving a Linear Programming (LP) problem for any of the input images inside a sliding window Q, moving the sliding window Q by $\Delta$ frames, and solving a resultant new LP problem, where $0<\Delta<W$ ensures a minimal overlap between a LP solution for the LP problem and another LP solution for the resultant new LP problem.

14. The surveillance system of claim 13, wherein the LP solutions comprise different sets of trajectories, and the processor is further configured to determine a matching cost for each of the trajectories that is inversely proportional to a number of shared detections there between.

15. A computer-implemented method for surveillance using multi-object tracking system, comprising:
capturing, by at least one camera, a set of input images of a given target area that includes a set of objects to be tracked;
storing, in a memory, a learning model configured to perform multi-object tracking by jointly learning arbitrarily parameterized and differentiable cost functions for all variables in a linear program that associates object detections with bounding boxes to form trajectories; and
performing surveillance, by a processor, of the given target area to (i) detect the objects and track locations of the objects by applying the learning model to the set of input images in a surveillance task that uses the multi-object tracking, and (ii), provide a listing of the objects and the locations of the objects for surveillance task,
wherein a bi-level optimization is used to minimize a loss defined on a solution of the linear program.

16. The computer-implemented method of claim 15, wherein the processor is further configured to generate output triples for the multi-object tracking task, each of the output triples consisting of (i) a bounding box describing the spatial location of a respective one of the objects, (ii) a detection probability for the respective one of the objects, and (iii) an image identifier for a respective one of the input images that includes the respective one of the objects.

17. The computer-implemented method of claim 15, wherein each of the trajectories comprises a set of detections belonging to a same one of the objects.

18. The computer-implemented method of claim 15, wherein each of the trajectories comprises a set of detections belonging to a same one of the objects.

19. The computer-implemented method of claim 15, wherein the linear program associates the bounding boxes from different ones of the input images with a same trajectory while preventing any two bounding boxes from any same one of the input images from belonging to the same trajectory.

* * * * *